C. J. GUSTAFSON.
FRICTION CLUTCH.
APPLICATION FILED DEC. 9, 1911.
1,166,832.
Patented Jan. 4, 1916.
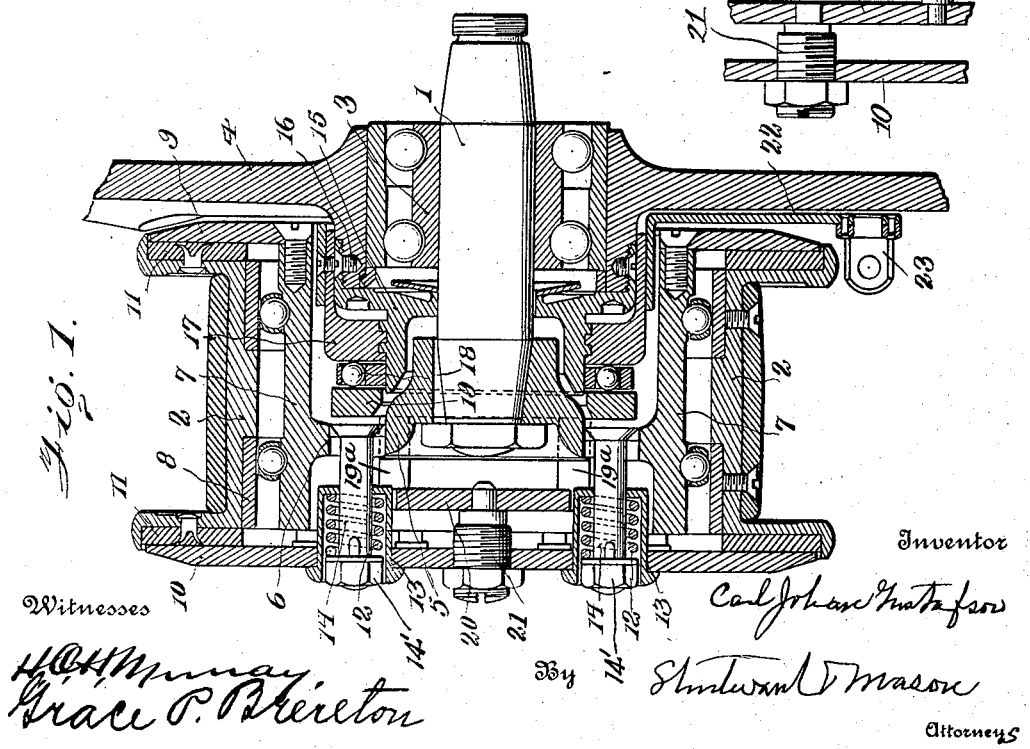

UNITED STATES PATENT OFFICE.

CARL JOHAN GUSTAFSON, OF SPRINGFIELD, MASSACHUSETTS, ASSIGNOR, BY MESNE ASSIGNMENTS, TO HENDEE MANUFACTURING COMPANY, OF SPRINGFIELD, MASSACHUSETTS, A CORPORATION OF MASSACHUSETTS.

FRICTION-CLUTCH.

1,166,832.      Specification of Letters Patent.      Patented Jan. 4, 1916.

Application filed December 9, 1911. Serial No. 664,902.

*To all whom it may concern:*

Be it known that I, CARL JOHAN GUSTAFSON, a subject of the King of Sweden, residing at Springfield, in the county of Hampden, State of Massachusetts, have invented certain new and useful Improvements in Friction-Clutches, of which the following is a description, reference being had to the accompanying drawing, and to the letters and figures of reference marked thereon.

The invention relates to new and useful improvements in friction clutches, and more especially clutches of this character which are adapted for connecting a driving pulley to the driving shaft.

An object of the invention is to provide friction clutching devices for connecting a driving pulley to a driving shaft, which devices are located substantially within the driving pulley.

A further object of the invention is to provide a device of the above character, wherein the clutch-operating parts are so constructed as to remain in various adjusted positions.

These and other objects will in part be obvious and will in part be hereinafter more fully described.

In the drawings which show by way of illustration one embodiment of the invention, Figure 1 is a sectional view through a driving pulley and the clutching devices therefor, embodying my improvements; and Fig. 2 is a front view of the same. Fig. 3 is a detail showing the connection between the mechanism for moving the outer clamping plate to release the driving pulley and the clamping plate; Fig. 4 is a detail showing the connection between the clamping plate and the rotating hub which causes the plate to rotate with the hub but permits the same to move laterally relative to the hub.

In the present embodiment of the invention, the driving shaft 1 is frictionally connected with a driving pulley 2. The shaft 1 may be the engine shaft or a counter-shaft operated directly from the engine shaft, where the improvements are applied to a motorcycle or the like. The driving pulley 2 is adapted to receive a belt, whereby the driving wheel of the motorcycle is operated.

The driving shaft 1 is connected to a collar 3, which is mounted in ball bearings in the frame 4 of the engine casing. On the outer end of the driving shaft 1 is a hub 5, which is formed with an outwardly projecting web 6, carrying laterally projecting flanges 7 forming the pulley support. The flanges 7 are formed with suitable grooves to receive balls, and the pulley 2 is formed with hardened wearing plates 8, which engage the balls so that the driving pulley may run freely on the support therefor.

In order that the driving pulley may be clamped to the support, so as to turn with the support, I have provided an inner clamping plate 9, and an outer clamping plate 10. The side faces of the driving pulley 2 have friction rings 11 secured thereto, and the clamping plates are so disposed as to engage these friction rings.

The clamping plate 9 is rigidly connected to the flange 7, and the pulley is mounted on the ball bearings in such a manner that said pulley may be moved laterally of the supporting flange into gripping contact with the clamping plate 9.

The clamping plate 10 is secured to the hub 5, so as to rotate therewith, by means of pins 10ª which are fixed to the clamping plate by riveting or otherwise and these pins engage in sockets 10ᵇ in the flanges 7 of the hub 5. The clamping plate 10 is adapted to move laterally to bring the pulley into gripping contact with the clamping plate 9, and at the same time, said plate 10 will engage the friction ring 11. The pulley will, therefore, be clamped between the plates 9 and 10. If the gripping pressure is sufficient, the driving pulley 2 will be caused to turn with the driving shaft, without any lost motion. If the pressure of the clamping plates against the driving pulley is relieved to a certain extent, then there would be a certain amount of slip between the driving pulley and the clamping plates, and the speed of the driving pulley would be less than that of the driving shaft.

In order that the clamping plates may be yieldingly pressed toward each other to grip the driving pulley, I have provided a plurality of springs 12. The outer clamping plate is formed with suitable openings, in which are mounted sleeves 13. These sleeves are partially closed at their inner ends. The springs 12 are housed in the sleeves, and rest against the partially closed inner ends thereof. Bolts 14 pass through the openings in the inner ends of the sleeve. These bolts also pass through suitable openings in the web 6 of the driving pulley. The heads of the bolts engage the web. On the outer ends of the bolts are nuts 14', which may be adjusted to vary the tension of the springs. The springs bear against the headed nuts, and the outer clamping plate is forced by the springs toward the web 6, and also toward the clamping plate 9, which is rigidly attached to the flange carried by the web 6. These springs will, therefore, cause the clamping plates to frictionally grip the driving pulley.

In order that the clamping plates may be separated, I have provided a collar 15, which freely encircles the driving shaft 1, and said collar is rigidly connected by screws 16 to the engine casing 4. Through this connection, the collar is held stationary. Mounted on the collar 15 is a sleeve 17. The collar and sleeve have interengaging threads so that when said sleeve 17 is turned relative to the collar, it will be moved endwise. Said sleeve engages ball bearings 18, which are interposed between the sleeve and a ring 19.

A plate 20 rests against the end of a screw 21, which is carried by the clamping plate 10. The plate 20 is connected to the ring 19, by suitable posts 19ᵃ so that when the ring 19 is moved laterally through the endwise movement of the sleeve 17, said plate 20 will cause the clamping plate 10 to move away from the driving pulley.

The threaded sleeve 17 carries an arm 22, which is provided with a perforated lug 23, and may be connected by a rod, so that said sleeve may be readily oscillated by the rider. The oscillation of the sleeve causes the same to move endwise, and the threaded connection between the sleeve and the collar is so formed, that said sleeve will be held in various adjusted positions without the use of stops or locking devices of any character. By adjusting the screw 21, the parts may be properly positioned, so that the shift of the sleeves through a predetermined range of movement, will secure a proper releasing of the clamping plates.

It is obvious that minor changes in the details of construction and the arrangement of parts may be made, without departing from the spirit of the invention, as set forth in the appended claims.

Having thus described my invention, what I claim as new and desire to secure by Letters Patent, is:—

1. The combination of a driving shaft, a pulley support connected to said shaft, a driving pulley mounted to rotate freely on said support, clamping plates mounted to turn with said support, said clamping plates being located on opposite sides of the pulley and the bearing therefor, means for causing said clamping plates to frictionally engage said pulley, and means for causing the clamping plates to release said pulley, including a fixed cam member, a movable cam member, and means intermediate said movable cam member and one of said clamping plates.

2. The combination of a driving shaft, a pulley support connected to said shaft, a driving pulley mounted to rotate freely on said support, clamping plates mounted to turn with said support, said clamping plates being located on opposite sides of the pulley and the bearing therefor, springs for normally moving one of said clamping plates toward the other, for causing said plates to frictionally grip said pulley, and means for disengaging said clamping plate from said pulley, including a fixed cam member, a movable cam member, and means intermediate said movable cam member and the movable clamping plate.

3. The combination of a driving shaft, a pulley support connected to said shaft, a driving pulley mounted to rotate freely on said support, ball bearings between said pulley and said support, clamping plates mounted to turn with said support, said clamping plates being located on opposite sides of the pulley and the bearing therefor and adapted to frictionally engage said pulley, a plurality of springs normally operating to hold said plates in frictional engagement with the pulley, and means for releasing the plates from said pulley, including a fixed sleeve having a cam thread thereon, a movable sleeve having a coöperating thread engaging the thread on the fixed sleeve, and devices intermediate said movable sleeve and one of said clamping plates, including a thrust bearing.

4. The combination of a driving shaft, a pulley support connected to said shaft, a pulley mounted to rotate freely on ball bearings carried by said pulley support, and also free to move laterally on said bearings, a clamping plate connected to said pulley support and adapted to engage one side of the driving pulley, said clamping plate being held from lateral movement, a movable clamping plate carried by said pulley support and adapted to engage the other side of said pulley, springs for moving said movable clamping plates toward the other, a sleeve having a thread and means coöperating with said thread whereby the sleeve is moved endwise, and means intermediate the sleeve and one of the clamping plates for causing said movable clamping plates to be moved away from the other.

5. The combination of a driving shaft, a pulley support connected to said shaft, a pulley mounted to rotate freely on ball bearings carried by said pulley support and also free to move laterally on said bearings, a clamping plate rigidly connected to said pulley support and disposed at one side of said pulley, a movable clamping plate carried by said pulley support, said movable plate being held from rotation relative to said support and free to move laterally thereon, said movable plate being adapted to engage the other side of said pulley and move said pulley into friction gripping contact with the other clamping plate, springs for moving said movable plate into gripping contact with the pulley, a fixed threaded member, a rotating sleeve having a thread to engage said threaded member, a thrust bearing engaging said sleeve, and means between said thrust bearing and said movable clamping plate whereby a rotation of said sleeve will cause said clamping plate to be moved, compressing the springs so as to release the driving pulley, said sleeve and thrust bearing being located within the pulley support.

6. The combination of a driving member, a driven member, friction plates carried by the driving member for engaging the driven member, yielding means for pressing one of said plates toward the other for gripping the driven member, means for moving one of said plates away from the other, including a sleeve, and devices connecting the sleeve to one of the clamping plates, which devices include an adjustable screw.

7. The combination of a driving member and a driven member, clamping plates for connecting the driving member to the driven member, yielding means for pressing one of said plates toward the other for gripping the driven member, means for moving one of said plates away from the other including a sleeve having a thread, a stationary collar having a thread coöperating with the thread on the sleeve, whereby when said sleeve is turned it is moved endwise, devices intermediate the sleeve and one of the clamping plates, said devices including a screw whereby the amount of separation of the gripping plates for a given movement of the sleeve, may be varied.

In testimony whereof I affix my signature, in presence of two witnesses.

CARL JOHAN GUSTAFSON.

Witnesses:
 JOHN T. CRONIN,
 J. H. O'BRIEN.

Copies of this patent may be obtained for five cents each, by addressing the "Commissioner of Patents, Washington, D. C."